Patented Nov. 10, 1942

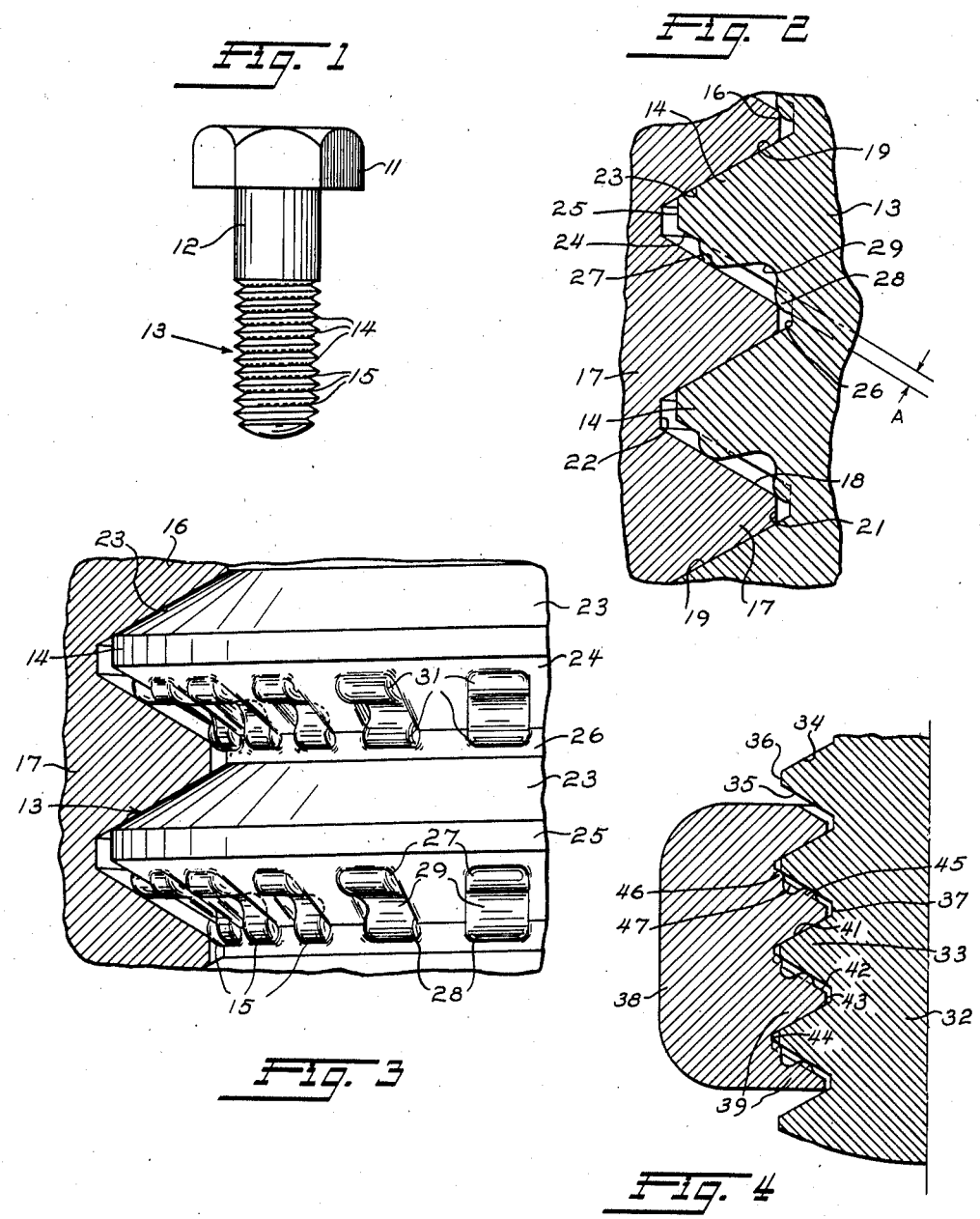

2,301,181

UNITED STATES PATENT OFFICE 2,301,181

SELF-LOCKING THREADED FASTENING ELEMENT

Eric M. Ilsemann, Newark, N. J.

Application October 23, 1941, Serial No. 416,280

2 Claims. (Cl. 151—22)

This invention relates to self-locking threaded fastening elements and is particularly concerned with self-locking threaded fastening elements wherein some of the threads of one element are specially deformed to provide the self-locking action.

In this specification the term "bolt" is intended to include screws and all other fastening elements having external thread, while the term "nut" is intended to include tapped holes and other fastening elements having internal thread.

Bolts and nuts designated as of the same thread size and made according to such standard specifications as U. S. Standard, S. A. E. Standard, etc., embody certain specified and measured clearances between the cooperating bolt and nut threads. The manner of determining and insuring these clearances and the degree of the same is given in mechanical handbooks. In addition to these specified clearances, the factor of permissible manufacturing tolerances for the threads has considerable bearing on the nature of the fit between such standard bolts and nuts adapted to be used together.

In practice, these clearances and tolerances are usually such that perfect tightness between standard thread bolts and nuts is impossible of attainment, and the fit is too loose to withstand vibration or relative movement of the parts connected. Special lock washers and lock nuts are commonly employed expedients tried to solve the problem of rendering these bolt and nut fits satisfactorily tight. Further attempts have been made to solve this problem by making the bolts and nuts of self-locking construction to avoid the use of such special lock washers or lock nuts, these self-locking features usually involving specially cut or deformed threads on one or both of the fastening elements. My present invention is in this field of self-locking devices, but embodies an utterly new structure and mode of operation from anything heretofore known in the art.

It is a major object of the present invention to provide a threaded fastening element such as a bolt, screw, nut or the like having specially deformed threads designed and sized to insure accurate alignment and concentricity of fit and sufficient friction with the standard threads of an interfitted threaded fastening element to provide reliable and automatic self-locking action.

A further object of the invention is to provide a threaded fastening element such as a bolt, screw, nut or the like wherein a plurality of the threads are deformed on the sides or faces opposite the load carrying side or face to provide clearance filling projections on each said thread. Preferably this deformation is obtained by displacement of the material of each thread adjacent the root thereof.

A further object of the invention is to provide a self-locking threaded fastening element wherein the load carrying thread faces are undeformed and the non-load carrying thread faces are formed with relatively resilient projections.

Further objects of the invention will presently appear as the description proceeds in connection with the appended claims and the annexed drawing wherein:

Figure 1 is a side elevation of one type of bolt made according to the invention.

Figure 2 is an enlarged section illustrating the construction and locking action of a bolt and nut assembly embodying a preferred specie of the invention.

Figure 3 is an enlarged elevation partly in section further illustrating the bolt and nut assembly of Figure 2.

Figure 4 is an enlarged section illustrating a species of the invention wherein the threads of the nut are deformed.

Figure 1 illustrates a cap screw or bolt having a standard hexagonal head 11, a cylindrical shank 12 and a threaded end section 13. This bolt may be made in any suitable automatic machine, the threads of section 13 being standard and cut in the usual manner in such machines. The non-load carrying faces of most of the bolt threads 14 of section 13 are deformed as indicated diagrammatically at 15 in Figure 1 and as illustrated in detail in Figures 2 and 3. This deformation is preferably effected after the standard thread rolling or cutting operation has been completed, and may comprise a final milling operation in the automatic machine.

Figure 2 illustrates a nut and bolt assembly according to the invention. Threads 16 of nut 17 and bolt threads 14 are in the thread profile form known variously as the Sellers', United States Standard, or American National Form profile, but it is to be understood that the invention is not limited to this form of thread and may be embodied in any equivalent form.

Each nut thread 17 has an upper side face 18, a lower side 19, a flat top 21 and a flat bottom 22. Each bolt thread 14 has an upper side face 23, a lower side face 24, a flat top 25 and a flat bottom 26. With the threads cut according to standard specifications such as those above mentioned, the faces 19 and 23 are the load carrying faces, and the usual bolt and nut assemblies would embody the longitudinal clearances indicated at A. Clearance A asserts itself between thread faces 18 and 24, or at the side of each bolt thread opposite the load carrying faces. These clearances A are small, usually a few thousandths of an inch, but are sufficient to render the assembly easily subject to axial play and loosening by vibration and movement.

In the embodiment of my invention of Figures 1-3, I provide locking projections on a plurality of bolt threads 14 adapted to engage the nut threads and thereby compensate for the clearances in the assembly to align and frictionally lock the bolt and nut together.

To this end, the non-load carrying under face 24 of each bolt thread 14 selected to be deformed at 15 is formed with two annular series of spaced rounded projections 27 and 28. These projections are preferably formed by striking or milling thread face 24 adjacent the root in a direction substantially normal to face 24, as with a relatively pointed instrument or tool such as a chisel or specially toothed roller. This causes simultaneous outward displacement or bulging of the metal or other material of thread 14 at opposite sides of the hollow 29 produced by the tool to form the projections.

Projection 27 is preferably located just below the top of the thread, about two-thirds of the distance between the top 25 and bottom 26, while projection 28 fills the corner between lower face 24 and bottom 26. The height of each of projections 27 and 28, as measured from underside 24, is substantially the same and is slightly greater than clearance A. Preferably the projections measure from about one to two or three thousandths of an inch more than the designed clearance, depending on thread size and corresponding clearance.

The manner in which projections 27 and 28 are formed, by displacement of the thread material insures that the surfaces of projections 27 and 28 and hollows 29 are substantially rounded and continuous with face 24 and root 26 with no sharp projecting edges. As shown in Figure 3, the end corners 31 of the projections are also rounded and smooth, which prevents gouging of the contacting nut face.

Since the bolts are metal, usually steel, projections 27 and 28 are strong enough to assert a powerful wedging action in the clearance space but are at the same time inherently sufficiently flexible and relatively resilient to themselves elastically deform under pressure and produce the required frictional locking action. The elastic properties of the projections enable the bolt to be reused any number of times with equivalent locking action.

Moreover this manner of forming the projections insures that only the non-load carrying faces of the threads are deformed, the load carrying faces remaining smooth and straight, and the bolt is in no manner weakened in section since the metal is displaced entirely from the threads outside the root. After deformation, the the threads are preferably hardened by a suitable heat treatment which increases their resistance to wear.

As the bolt and nut are assembled as shown in Figure 2, projections 27 and 28 fill the space of clearance A and powerfully but resiliently urge load faces 19 and 23 together. The projections bear frictionally at spaced points on the non-load carrying face 18 of the nut and insure accurate alignment and full surface constant frictional engagement of the load faces. The inner projections 28, which act substantially at the corner of thread 16 between face 18 and top 21, not only assist projections 27 in the above function but also insure that the bolt and nut are maintained concentric with each other during assembly and disassembly.

In practice, I employ projections 27 and 28 on all the threads except the two or three end threads as indicated in Figure 1. These undeformed lower threads serve as pilots for starting the threaded engagement, and the locking action starts taking place at the first thread beyond these undeformed threads and continues to the last deformed thread. Preferably all threads intermediate these lower two or three undeformed threads and shank 12 are provided with locking projections as described.

Since the locking action is solely between the bolt and nut threads it is independent of the location of the nut along the bolt, and equally independent of the parts to be secured together.

Figure 4 illustrates the invention as applied to the nut element of the combination instead of the bolt as in Figure 2. Here bolt 32 is formed with standard threads 33 each having an upper load carrying face 34, a lower non-load carrying face 35, a flat top 36 and flat bottom 37. Nut 38 is formed with standard sized threads 39 each having a lower load carrying face 41, an upper non-load carrying face 42, a flat top 43 and a flat bottom 44.

Each non-load carrying face 42 is formed with an annular series of spaced projections 45 and 46 separated by hollows 47. Projections 45 and 46 are preferably made in the same manner and shape as projections 27 and 28 above described, and obviously function in the same manner in the bolt and nut assembly, so that further description of this embodiment of the invention is deemed unnecessary.

While I have above described my resilient locking projections as a series of relatively short separate individual projections spaced around the non-load carrying thread face, it is obvious that the distance between the spaced projections may be either increased or decreased to the point where they become continuous.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In a self-locking threaded fastening element, a plurality of successive standard-cut threads having substantially undeformed load carrying faces adapted to contact the load carrying thread faces of a standard-threaded member in threaded engagement therewith, integral frictional locking means projecting from the lower ends of the non-load carrying faces only of the threads of said fastening element and adapted to engage the adjacent threads of said member substantially at a top corner thereof, and further integral frictional locking means on the non-load carrying faces only of the threads of said fastening element disposed outwardly of said first locking means and adapted to frictionally engage non-load carrying thread faces of said member.

2. In a self-locking threaded fastening element adapted to interfit with a complementary standard-cut threaded member, a plurality of successive standard-cut threads having their load carrying faces substantially undeformed, and integral frictional locking projections consisting of material displaced from the threads spaced along the non-load carrying faces only of said threads, a set of said projections being located at the bottoms of the threads and a spaced set of said projections being disposed outwardly therefrom but inwardly of the tops of said threads.

ERIC M. ILSEMANN.